Figure 1:
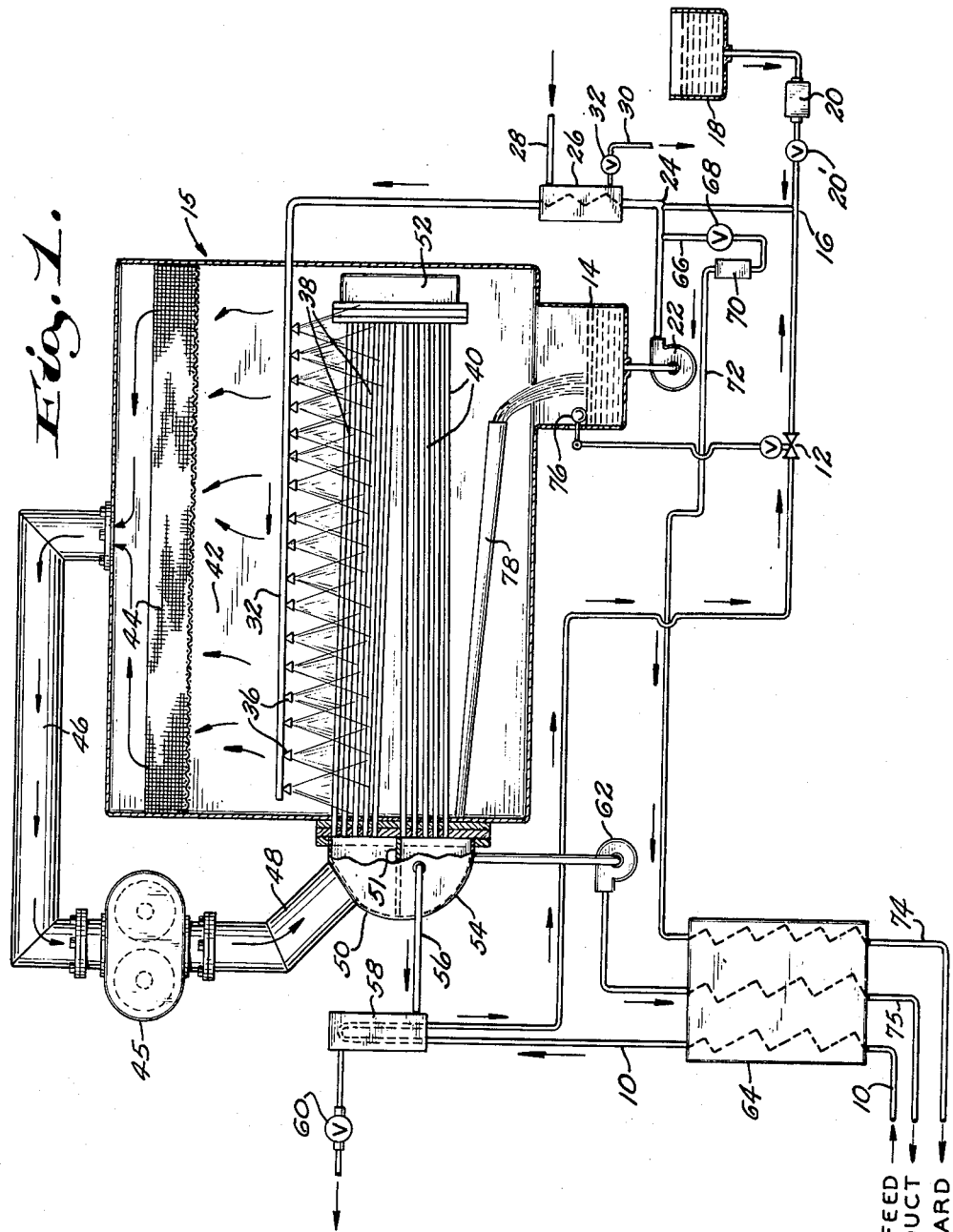

April 12, 1966 F. A. LOEBEL 3,245,883
CLOSED CIRCUIT DISTILLANT FEED WITH INDIRECT
HEAT EXCHANGE CONDENSATION
Filed Jan. 29, 1962 2 Sheets-Sheet 2

Fig. 2.

FEED
DISTILLATE
OVERBOARD

INVENTOR
FRED. A. LOEBEL

BY *Moselle & Moselle*
ATTORNEYS.

United States Patent Office 3,245,883
Patented Apr. 12, 1966

3,245,883
CLOSED CIRCUIT DISTILLANT FEED WITH INDIRECT HEAT EXCHANGE CONDENSATION
Frederick A. Loebel, Milwaukee, Wis., assignor to Aqua-Chem, Inc., Waukesha, Wis., a corporation of Wisconsin
Filed Jan. 29, 1962, Ser. No. 169,480
6 Claims. (Cl. 203—7)

The present invention relates to the processing and treating of feed liquid. A general object of the invention is to provide a vapor recompression system and method of operating the same wherein vapors extracted from the feed liquid are circulated at condensing pressure inside the tubes of a horizontal heat exchanger, the latter being disposed in a vaporizing chamber with the preheated feed mixture being distributed downwardly over the tubes, and wherein unvaporized feed mixture is recirculated. With the present invention it is possible to have efficient operation with only two passes on the steam side while using tubes 20 to 30 feet in length, thereby substantially decreasing manufacturing costs.

A more specific object of the invention is to provide a system wherein the condensate is caused to move through tubes which are slightly downwardly inclined in the direction of flow to thereby promote proper drainage of the condensate and prevent too deep an accumulation in the vaporizing tubes.

A further object of the invention is to provide a system as above described wherein the rate of recirculation of unvaporized feed mixture is maintained in a predetermined novel manner to obtain maximum efficiency.

A further aspect of the invention relates to production of potable and/or pure water from saline or impure water by treating the feed liquid chemically and subjecting it to process conditions in vapor recompression systems to the end that scale accumulation on heat transfer surfaces is substantially reduced. While this phase of the invention does relate broadly to systems and processes for producing from saline and impure water a potable or chemically pure water, it is especially advantageous in the production of chemically pure or potable water from systems employing vapor recompression cycles, and for the purposes of the present disclosure is so described.

It is known to use various condensed phosphate compounds having a ratio of metallic oxide to $P_2O_5$ of less than 3 on a formula-weight basis to inhibit precipitation of hardness in water for service (e.g. wash water). Such treatment has not been deemed suitable for boiler make-up water under some conditions because the phosphates precipitate during boiling thereby fouling heat exchange surfaces.

Briefly, this phase of the invention comprehends the chemical pretreatment of saline or brackish sea water as used in conjunction with vapor compression distiller using a vaporizing chamber to produce steam which is subsequently compressed and circulated through the vaporizing chamber in indirect heat exchange relation with the feed. The compressed vapor is condensed during the course of its indirect heat exchange with the feed and is thereafter drawn off as the product.

The feed is chemically pre-treated with a compound which inhibits scale formation. The treatment is performed on the feed before being circulated into the vaporizing chamber. The preferred pre-treating chemicals (termed "polyphosphates") will be described in greater detail below. The polyphosphate is preferably in solution when added to feed water with which it admixes. The feed water carrying the polyphosphates is then circulated into the vaporizing chamber. The vaporizing chamber pressure is manipulated and controlled so that the temperature of the liquid feed is maintained within a certain range, preferably from 160° to 200°, and more preferably from 180° to 195°, and still more preferably the vaporizing chamber temperature of the feed water is maintained at about 190° F.

Incontrast to maintaining the preferred temperature range in the vaporizing chamber, if the temperature is allowed to rise above about 200°, for example, the polyphosphates convert to orthophosphates which are insoluble in combination with the hardness of the feed water. When insolubility occurs, the phosphates (orthophosphates) precipitate out and accumulate on various surfaces including the heat transfer surfaces in the vaporizing chamber. In brine recirculation systems the precipitated phosphates create added operating problems in scaling of pipes, heat exchanger tubes and spray nozzles.

It will thus be seen that maintenance of the temperature at a predetermined level or range maintains the scale inhibiting ingredients soluble and effective, thereby reducing scale accumulation. To further reduce scale accumulation, a construction which reduces a low residence time in the vaporizing chamber is employed.

One embodiment of the invention contemplates deaerating the feed liquid in a scrubber which uses a portion of the vapors drawn from the vaporizing chamber.

The invention is directed to both the method and apparatus for treating feed liquids. While the invention is particularly suitable for use in producing potable water from salt or from brackish water having a saline content of 0.2% to 3.5% by weight, it may also be used for various analogous purposes such as the treatment of sulphite liquors or the treatment of fresh water to produce a chemically pure product therefrom, and other features, advantages, and objects will become apparent from the following disclosure when read in conjunction with the accompanying drawings wherein:

FIG. 1 schematically represents one embodiment of the invention wherein feed water may optionally be treated by adding a polyphosphate solution thereto prior to delivering the treated feed water into the vaporizing chamber; and FIG. 2 is another embodiment of the invention wherein the feed water is deaerated in a scrubber.

Both embodiments of the invention contemplate using a horizontal tube film type of evaporator having vapor recompression equipment associated therewith. Similar reference numerals refer to the same parts in all of the views.

Referring now to FIG. 1, feed water is brought in through conduit 10 and passes through a series of heat exchangers 64 and 58 (described further below) until it reaches the liquid level responsive feed control valve 12. The valve 12 is responsive to the liquid level of the brine in the hotwell 14 of the vaporizing chamber 15. The feed water is only partially heated to its ultimate temperature by the time it reaches valve 12. The feed passes through valve 12 and goes to a T-connection 16 at which point a solution of polyphosphates or other scale inhibiting chemicals may, for certain uses, be added to the incoming feed.

A solution of polyphosphates 21 or other chemicals is disposed in an appropriate reservoir 18 from which the solution is withdrawn by the metering pump 20, past an on-off valve 20' and directed to the junction 16.

The mixture of feed water and chemical solution (hereinafter, treated feed) moves from the T or junction 16 through subsequent heat exchange steps with a pressure in the spray nozzle manifold 32 in the range of 0.2 p.s.i. to 20 p.s.i. above that maintained in the vaporizing chamber, and ultimately is sprayed or otherwise distributed on heating surfaces disposed in the vaporizing chamber 15. En route to said chamber, hot brine or other concentrate is delivered from the hotwell 14 by means of a brine withdrawal and circulating pump 22 and a portion thereof is added for recirculation to the treated feed stream at the junction 24. The fluid conveyed into the vaporizing chamber comprises the mixture of fluids joining at juncton 24 of FIG. 1 and is hereinafter referred to as the treated feed liquid. In the case of salt water treatment the recirculated liquid may comprise as high as 80% of the feed mixture to be distributed at 32.

Treated feed liquid moves from junction 24 through a shell and tube heater 26 where it is subjected to indirect heat exchange with low pressure steam entering the heater 26 through conduit 28. The heat exchanger 26 is a makeup heat exchanger which adds to the feed liquid at least the amount of heat required to raise it to a temperature such that a suitable portion of the treated feed liquid will vaporize upon being sprayed or distributed upon the heat exchange surfaces in the chamber 15. The low pressure steam used as a heating fluid in heater 26 is drawn from any suitable source such as a boiler, a prime mover exhaust, or the like. The steam condenses in the makeup heater 26 and is withdrawn through line 30, a valve 32 controlling the withdrawal rate.

In the illustrated embodiments, the feed liquid is fed through spray nozzle manifolds 32. The manifold has a plurality of spray nozzles generically referred to as 36 arranged therealong. The liquid leaving the spray nozzles is directed against heat exchange surfaces defined by the tubes 38 and 40. The tubes 38 and 40 will be hereinafter described with respect to the vapor recompression cycle. Due to the heat and pressure to which the feed liquid is subjected inside the vaporizing chamber, a portion of the water contained therein vaporizes and collects in the wet vapor zone 42 which is disposed above the spray manifold 32 and below the demister or entrainment separator 44.

The vapor pressure in the vaporizing chamber is maintained at a pressure corresponding to the saturation pressure for the selected temperature. The selected temperature is such that when polyphosphates are used they are prevented from converting from an orthophosphate condition and thereby precipitating and otherwise coming out of solution which would thereby cause scaling on the heat transfer surfaces 38 and 40. The temperature is controlled by maintaining a preselected pressure. The pressure is maintained so that when the valve 20' is open for the use of polyphosphates, the temperature is maintained in the range from 160° to 200°, preferably in the range from 180° to 195° and still more preferably at a pressure of 9.34 lbs. per sq. in. absolute which corresponds to a saturation temperature of 190° F. in the collection space 42.

The pressure is maintained (thereby maintaining the selected temperature) by the heat transfer effect in the tubes 38 and 40 and by withdrawing a stream of vapor and passing it through a vapor recompression in the recycling system which is now described. A compressor 45 draws vapors from the vapor collection space 42 through the demister 44 and out of the chamber 15 by means of a vapor exit conduit 46. The vapor compressor 45, when the system is operating at steady state conditions, withdraws a constant volume of vapor and thereby maintains a pressure appropriate to the desired vaporizing or saturation temperature. The compressor 45 compresses the withdrawn vapors to such a condensing pressure that a differential of from 2° F. to 20° F. is provided between the temperature of the feed material and the saturation condensing temperature corresponding to said condensing pressure.

The vapor compressor 45 compresses the withdrawn vapor and discharges it through a conduit 48 to the manifold 50 which is the entrance to the inside of the heat exchange tubes 38. The vapor flows through 50, through 38 and then into the return manifold 52. In the course of its travel through the tubes 38, the compressed vapor gives up a part of the heat of compression and its latent heat to the feed liquid being sprayed against the other side of the tubes 38. Thus, the vapors discharged from the vapor compressor are in indirect heat exchange relation to the sprayed feed liquid. The vapor also begins to condense at this time. The mixture of condensate and vapor travels through the return manifold 52 and enters the tubes 40 through which it travels until it reaches the discharge manifold 54 on the lower side of partition 51. With the present invention it is possible to have efficient operation with only two passes on the steam side using tubes of 20 to 30 feet length for the tubes 38 and 40, preferably ⅝ inch to 1¼ inch outside diameter. It is thus possible to substantially decrease manufacturing costs by using tubes of this length. In both forms of the invention the tubes 38 are inclined slightly downwardly in the direction of flow. This promotes proper drainage of the condensate and prevents too deep an accumulation of condensate in the tubes, which condensation would reduce efficiency. It is found that an incline of ½° to 5° for a 30-foot tube will produce good results. On a test device with tubes of ⅝ inch outside diameter 8 feet long, a 1° slope on both the upper and lower passes 38 and 40 produced high efficiency. As a substitute for the use of two passes of about the same number of tubes as is illustrated, substantially all of the tubes may be arranged in one pass with a slight incline. It is preferred, however, to have the tubes divided into two passes with approximately ⅔ in the first pass and ⅓ in the second pass.

As the fluid exits from the manifold 54, the uncondensed gases and vapors (a portion of which are non-condensables) separate from the liquid and are withdrawn through a vent line 56 and a vent condenser 58 by means of a vacuum pump 60. The fluids flowing through the vent line 56 are placed in indirect heat exchange with the feed in the vent condenser. The non-condensable gases and vapors are withdrawn by the vacuum pump and any condensate formed on the vent gas side may be recovered.

The condensate which emerges into the manifold 54 is withdrawn by a product pump 62 and directed through a feed preheater 64 where it is placed in indirect heat exchange relation with at least a portion of the incoming feed 10. The incoming feed 10 is also placed in indirect heat exchange relation with the portion of brine that is directed overboard from the pump 22. A conduit 66 diverts the brine going overboard from pump 22 through a control valve 68, a flow meter 70 and another conduit 72 which carries the overboard brine through the feed preheater, thence overboard through conduit 74.

In a case where the feed material is sulphite liquor, the concentration of solids withdrawn through lines 66–72 is maintained in the range of 10%–55% by weight.

The distillate is withdrawn to storage or use through a conduit 75. A liquid baffle 78 may be provided underneath the heat exchange tubes 38–40 in order to collect the liquid residue left after the flushing process and direct it into the brine hotwell.

In reviewing the system of FIG. 1, it will be observed that a liquid level controller 76 is used in the brine hotwell 14 to control the feed valve 12. It will also be observed that the tubes 40 are maintained in the vapor space and are not immersed in the brine, being sloped so that condensate running through them travels downhill en route to the manifold 54.

The polyphosphates referred to heretofore may comprise one or more of the following compositions, it being understood that various mixtures and solutions of the compositions may be employed, and that one of the main polyphosphates can be used in conjunction with any of the others: tetrasodium pyrophosphate, sodium tripolyphosphate, and sodium hexametaphosphate. In the case of sea water treatment, these are used at the rate of one-half to ten parts chemical treatment per one million parts of raw sea water feed.

It will be observed that, in the course of operating the above described system of FIG. 1, the heat of compression in the vapor compressor 45 is given up to the sprayed feed liquid in the vaporizing chamber. Also, the maintenance of an appropriate temperature in the shell and tube heater 26 and in the vaporizing chamber is such that when the polyphosphates in solution are used they are not substantially converted to the orthophosphate condition. When the system is operated at higher temperatures, the amount of orthophosphates formed increase with increasing liquid temperature, thereby producing a scaling problem. Therefore, at higher temperatures such as 212° F. other chemicals such as acids or acidic salts are used with or without deaeration as will be described in connection with FIG. 2, and the valve 20' of FIG. 1 is kept closed.

Referring to the left side of the vaporizing chamber as seen in FIG. 2, there is illustrated an uncondensed vapor return conduit 102 which is connected between the discharge side of the tubes 40 at manifold 54 to transmit uncondensed vapors—a fraction of which are non-condensables—from the tube discharge to the vapor space 42 within the vaporizing chamber. A control valve 104 is disposed in this conduit. A separator plate 108 advantageously isolates the inlet manifold 50 from the discharge manifold 54.

In both forms of the invention the spraying of the mixture of recirculated concentrated material and raw feed material from the nozzles 36 is at such a rate that the ratio by weight of vaporizing liquid contained therein to condensate discharged at 75 lies in the range of 2 to 40, and preferably from 4 to 10 if the liquor being evaporated has small scaling tendencies. A pump 22 is selected which has such characteristics in combination with the distribution system at 32–36 as to produce the desired rate.

The temperature of the treated feed liquid as it emerges from heater 26 should be approximately at the boiling temperature of the water in the vaporizing chamber.

The embodiment of FIG. 2 is generally similar to FIG. 1, but involves the deaeration of the feed water. The deaerator 90 is essentially a scrubber of any conventional construction comprising a closed vessel 92 filled with saddles, raschig rings, spheres, or may even have a series of perforated trays disposed therein one above the other, generally denoted 94. The feed water is sprayed into the top of the deaerator by the nozzle 96 and travels down through the deaerator by gravity counter-currently to scrubbing gases passing from the vaporizing chambers through line 98, thence the feed water passes through the hotwell entrance conduit 99 to mix with the unevaporated liqiud in the hotwell 14. The feed water is directed through conduit 10 from the feed preheater, past the level-responsive controller 12 and through vertical conduit 10' to the nozzle in the top of the deaerator.

In the system of FIG. 2, when operated at a relatively high temperature such as 212° F., it is necessary to use chemicals other than polyphosphates. Such chemicals may be added from reservoir 150 through use of a pump 151 into the feed water line leading to the deaerator as shown. It is preferred to use sulphuric acid, hydrochloric acid, sodium bisulphate, sulphamic acid, or citric acid. In addition in the feed water line, downstream of the deaerator, the pH may be adjusted with the addition of alkaline chemicals from tank 153 as at 154 to protect metal surfaces against attack by feedwater rendered corrosive by acid treatment or incomplete deaeration.

The vapor stream used to scrub the liquid contains both condensible fractions and non-condensible fractions. The line 98 removes this vapor stream from the vaporizing chamber through conduit 100 up through the deaerator where the major portion of the condensible fraction is condensed by the liquid sprayed from the nozzle 96. The non-condensible fraction is thereafter removed and rejected to the atmosphere. Condensible fractions entering the scrubber 90 from conduit 100 are recovered by condensing and being recovered in the stream of downcoming liquid.

The scrubbed or degassed liquid leaves the deaerator and enters the hotwell 14 from which it is withdrawn by the circulating pump 22. Thereafter the treated feed water moves through the make-up heater 26 and into the multiple sprays 36 in the vaporizing chamber.

While FIG. 1 shows means for adding polyphosphates when required and while FIG. 2 shows means for adding acids in another form of the apparatus, it is to be understood that acids may be added on an intermittent basis directly into the hotwell 14 and this may be a satisfactory procedure when treating certain types of material.

Although particular embodiments of the invention have been shown and described in full here, there is no intention to thereby limit the invention to the details of such embodiments. On the contrary, the intention is to cover all modifications, alternatives, embodiments, usages and equivalents of the invention as fall within the spirit and the scope thereof, the specification, and the appended claims.

What I claim is:

1. A process of operating a vapor recompression system wherein compressed vapors extracted from a liquid feed material are circulated at a condensing pressure inside the tubes of a generally horizontal-tube heat exchanger, the tubes being disposed in the vapor space of a vaporizing chamber, including the steps of distributing a preheated feed material to be concentrated generally downwardly over said tubes, supplying preheated feed material for said distributing step, withdrawing the vapors evolved from said feed material, compressing said withdrawn vapors, circulating the compressed vapors through the heat exchanger tubes in condensing indirect heat exchange relation to the feed material, recovering the condensate formed in said circulating step, collecting the concentrated material remaining after the vapors have been withdrawn, withdrawing the concentrate from the point of collection, directing a portion of the withdrawn concentrate through a valve and metering device to discharge some of the collected concentrate and to control the rate of discharge so as to maintain a desired concentration of the collected concentrated material, and recirculating the remaining portion of the collected concentrated material into feed for use in said distributing step.

2. The process according to claim 1, including the step of deaerating the feed material by vapors from said vaporizing chamber before said feed material is distributed in said vaporizing chamber.

3. The process according to claim 1, including the step of imposing a pressure upstream of said distributing point in the range of from 0.2 p.s.i. to 20 p.s.i. above the pressure in the vaporizing chamber.

4. The process according to claim 1, wherein said withdrawn vapors are compressed to a condensing pressure such that a differential in the range of from 2° F. to 20° F. is provided between the temperature of the feed material distributed over the tubes and the saturation condensing temperature corresponding to said condensing pressure.

5. The process according to claim 1, including the step of distributing the mixture of recirculated concentrated material and feed at such a rate so that the weight of vaporizable liquid flowing over the tubes at any time is from 2 to 40 times the weight of distillate being produced inside the tubes.

6. The process according to claim 1, including the step of adding polyphosphates to the feed material prior to the distributing step while controlling the temperature of the feed material in the vaporizing chamber to between 160° F. and 200° F.

(References on following page)

References Cited by the Examiner

UNITED STATES PATENTS

| | | | |
|---|---|---|---|
| 322,458 | 7/1885 | Lee | 202—236 X |
| 450,361 | 4/1891 | Baird. | |
| 614,776 | 11/1898 | Stocker. | |
| 1,150,713 | 8/1915 | Soderlund | 159—24 |
| 1,200,996 | 10/1916 | Soderlund et al. | 159—24 |
| 1,358,091 | 11/1920 | Mears. | |
| 1,425,020 | 8/1922 | Josse et al. | 159—24 |
| 1,600,106 | 9/1926 | Fothergill. | |
| 2,389,064 | 11/1945 | Latham | 202—75 |
| 2,441,361 | 5/1948 | Kirgan. | |
| 2,449,587 | 9/1948 | Chambers. | |
| 2,514,944 | 7/1950 | Ferris et al. | 202—236 X |
| 2,537,259 | 1/1951 | Cleaver et al. | 202—75 X |
| 2,733,196 | 1/1956 | Hillier et al. | |
| 2,825,680 | 3/1958 | Stutz | 202—236 |
| 2,881,116 | 4/1959 | Siegfried | 202—197 X |
| 2,885,328 | 5/1959 | Williamson | 202—177 X |
| 2,899,366 | 8/1959 | Hickman. | |
| 3,000,795 | 9/1961 | Goeldner. | |
| 3,020,214 | 2/1962 | Bodohn et al. | 202—236 |
| 3,161,574 | 12/1964 | Elam | 202—75 X |

FOREIGN PATENTS 395,108  2/1909  France.

OTHER REFERENCES

Ellis: Fresh Water From the Sea, Ronald Press, N.Y., 1954, TD 430 E49, pages 151–156.

Symposium on Saline Water Conversion 1957, Office of Saline Water in Cooperation With National Academy of Sciences National Research Council, publication 568, pages 44–50, TD 433 S8.

NORMAN YUDKOFF, *Primary Examiner.*

GEORGE D. MITCHELL, *Examiner.*